United States Patent
Bushman et al.

(10) Patent No.: US 9,684,458 B2
(45) Date of Patent: *Jun. 20, 2017

(54) EXPOSING PROPRIETARY DATA TO A HYPERVISOR AS NATIVE HYPERVISOR DATA

(71) Applicant: STORAGECRAFT TECHNOLOGY CORPORATION, Draper, UT (US)

(72) Inventors: Nathan S. Bushman, Pleasant Grove, UT (US); Maxim Shatskikh, Moscow (RU)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,331

(22) Filed: Oct. 3, 2016

(65) Prior Publication Data

US 2017/0024133 A1    Jan. 26, 2017

Related U.S. Application Data

(63) Continuation of application No. 14/966,388, filed on Dec. 11, 2015, now Pat. No. 9,489,140, which is a
(Continued)

(51) Int. Cl.
  *G06F 17/30* (2006.01)
  *G06F 3/06* (2006.01)
  *G06F 9/455* (2006.01)

(52) U.S. Cl.
  CPC .......... *G06F 3/061* (2013.01); *G06F 3/0604* (2013.01); *G06F 3/0643* (2013.01);
(Continued)

(58) Field of Classification Search
None
See application file for complete search history.

(56) References Cited

U.S. PATENT DOCUMENTS 6,549,918 B1   4/2003   Probert, Jr. et al.
8,332,689 B2   12/2012  Timashev et al.
(Continued)

FOREIGN PATENT DOCUMENTS

EP   2488946   8/2012
EP   2580662   4/2013
(Continued)

OTHER PUBLICATIONS

"Veeam vPower NFS Service" by Veeam Help Center as of Apr. 22, 2014, accessed from http://helpcenter.veeam.com/backup/70/vsphere/vpower_nfs_service.html on Aug. 22, 2014.
(Continued)

*Primary Examiner* — Bai D. Vu
(74) *Attorney, Agent, or Firm* — Maschoff Brennan (57) ABSTRACT

Exposing proprietary data to a hypervisor as native hypervisor data. In one example embodiment, one or more non-transitory computer-readable media store one or more programs that are configured, when executed, to cause one or more processors to perform a method of exposing proprietary data to a hypervisor as native hypervisor data. The method may include identifying a proprietary disk file having a proprietary file format and creating a plugin file corresponding to the proprietary disk file with the plugin file having a plugin file format which is different from a native hypervisor disk file format.

14 Claims, 5 Drawing Sheets

Related U.S. Application Data continuation of application No. 14/569,330, filed on Dec. 12, 2014, now Pat. No. 9,311,003, which is a continuation of application No. 14/293,122, filed on Jun. 2, 2014, now Pat. No. 8,943,105.

(52) U.S. Cl.
CPC .......... *G06F 3/0659* (2013.01); *G06F 3/0661* (2013.01); *G06F 3/0664* (2013.01); *G06F 3/0667* (2013.01); *G06F 3/0673* (2013.01); *G06F 3/0674* (2013.01); *G06F 9/45545* (2013.01); *G06F 9/45558* (2013.01); *G06F 17/30076* (2013.01); *G06F 17/30233* (2013.01); *G06F 17/30569* (2013.01); *G06F 2009/45579* (2013.01); *G06F 2009/45583* (2013.01)

(56) References Cited

U.S. PATENT DOCUMENTS

| | | |
|---|---|---|
| 8,370,835 B2 | 2/2013 | Dittmer |
| 8,402,309 B2 | 3/2013 | Timashev et al. |
| 8,413,146 B1 | 4/2013 | McCorkendale et al. |
| 8,528,107 B1 | 9/2013 | Ginzton et al. |
| 8,566,279 B1 | 10/2013 | Martin et al. |
| 8,566,640 B2 | 10/2013 | Timashev et al. |
| 8,745,444 B2 | 6/2014 | Timashev et al. |
| 8,943,105 B1 | 1/2015 | Bushman et al. |
| 9,015,129 B2 | 4/2015 | Timashev et al. |
| 9,075,649 B1 | 7/2015 | Bushman et al. |
| 9,311,003 B2 | 4/2016 | Bushman et al. |
| 2010/0011014 A1 | 1/2010 | Odulinski et al. |
| 2011/0087874 A1 | 4/2011 | Timashev et al. |
| 2011/0196842 A1 | 8/2011 | Timashev et al. |
| 2011/0307657 A1 | 12/2011 | Timashev et al. |
| 2012/0017114 A1 | 1/2012 | Timashev et al. |
| 2012/0185427 A1 | 7/2012 | Fontignie et al. |
| 2012/0278806 A1 | 11/2012 | Wade et al. |
| 2012/0284236 A1 | 11/2012 | Timashev et al. |
| 2013/0212437 A1 | 8/2013 | Timashev et al. |
| 2014/0006858 A1 | 1/2014 | Helfman et al. |
| 2014/0047268 A1 | 2/2014 | Timashev et al. |
| 2014/0281217 A1 | 9/2014 | Beam et al. |
| 2014/0289566 A1 | 9/2014 | Timashev et al. |
| 2014/0351810 A1 | 11/2014 | Pratt et al. |
| 2014/0365740 A1 | 12/2014 | Vasilyev et al. |
| 2015/0106802 A1 | 4/2015 | Ivanov et al. |
| 2015/0347014 A1 | 12/2015 | Bushman et al. |
| 2016/0098204 A1 | 4/2016 | Bushman et al. |
| 2016/0216990 A1 | 7/2016 | Bushman et al. |

FOREIGN PATENT DOCUMENTS

| | | |
|---|---|---|
| EP | 2596426 A2 | 5/2013 |
| JP | 5819561 | 10/2015 |
| JP | 2016006646 | 1/2016 |
| WO | 2011046813 A2 | 4/2011 |
| WO | 2011046813 A3 | 7/2011 |
| WO | 2011159701 A2 | 12/2011 |
| WO | 2012012365 A2 | 1/2012 |
| WO | 2011159701 A3 | 4/2012 |
| WO | 2012012365 A3 | 4/2012 |
| WO | 2012057942 A1 | 5/2012 |
| WO | 2014199230 A2 | 12/2014 |
| WO | 2014199230 A3 | 4/2015 |

OTHER PUBLICATIONS

Bill Oliver, "Symantec NetBackup 7.6 Claims 400x Faster VM Recovery", Web Article, Jan. 23, 2014, Toms IT PRO, accessed Sep. 30, 2014, http://www.tomsitpro.com/articles/symantec-netbackup-backup-vmware-recovery,1-1599.html.
"NetBackup Instant Recovery for Vmware", Online Discussion Forum Post, Feb. 13, 2014, Symantec, accessed Sep. 30, 2014, http://www.symantec.com/connect/forums/netbackup-instant-recov.
"About Instant Recovery for VMware", Online Article, Oct. 2, 2013, Symantec, accessed Sep. 30, 2014, http://www.symantec.com/business/support/index?page=content&id=HOWTO92050#v75775331.
"Instant Recovery for VMware", Web Article, Aug. 2, 2013, Symantec, accessed Sep. 30, 2014, downloaded from http://kbdownload.symantec.com/resources/sites/BUSINESS/content/live/TECHNICAL_SOLUTION/211000/TECH211113/en_US/NetBackup%207.6%20Feature%20Briefing%20-%20Instant%20Recovery%20for%20VMware.pdf?_gda_=14712115174_0af0636df3aca9da6d796d34e8ca128c.
"Instant VM Recovery" by Veeam Help Center as of Jun. 3, 2014, accessed from http://helpcenter.veeam.com/backup/70/hyperv/index.html on Apr. 27, 2015.
"Instant VM Recovery" by Vembu accessed from https://www.vembu.com/features/bdr/disaster-recovery/ on Apr. 27, 2015.
United States Patent and Trademark Office; Office Action; mailed Sep. 25, 2014 for U.S. Appl. No. 14/293,122, filed Jun. 2, 2014.
United States Patent and Trademark Office; "Notice of Allowance" mailed Nov. 21, 2014 for U.S. Appl. No. 14/293,122, filed Jun. 2, 2014.
United States Patent and Trademark Office; Office Action; mailed Jan. 29, 2015 for U.S. Appl. No. 14/569,330, filed Dec. 12, 2014.
United States Patent and Trademark Office; Office Action; mailed Aug. 20, 2015 for U.S. Appl. No. 14/569,330, filed Dec. 12, 2014.
United States Patent and Trademark Office; Notice of Allowance; mailed Dec. 2, 2015 for U.S Appl. No. 14/569,330, filed Dec. 12, 2014.
United States Patent and Trademark Office; Office Action; mailed Jun. 17, 2015 for U.S. Appl. No. 14/966,388, filed Dec. 11, 2015.
United States Patent and Trademark Office; Notice of Allowance; mailed Jul. 12, 2016 for U.S. Appl. No. 14/966,388, filed Dec. 11, 2015.
United States Patent and Trademark Office, Notice of Allowance, Apr. 27, 2015, 8 pages, in U.S. Appl. No. 14/605,699.
European Patent Office, European Search Report, dated Mar. 21, 2016, in application 15170364.2, 8 pages.
European Patent Office, European Search Report, dated Jun. 22, 2016, in application 15172172.7, 9 pages.
Oracle, Manger Users Guide, Release 2.2, Nov. 2009, 154 pgs.

EXPOSING PROPRIETARY DATA TO A HYPERVISOR AS NATIVE HYPERVISOR DATA

CROSS-REFERENCE TO RELATED APPLICATIONS

This application is a continuation of U.S. patent application Ser. No. 14/966,388, filed Dec. 11, 2015, which is a continuation of U.S. patent application Ser. No. 14/569,330, filed Dec. 12, 2014, now U.S. Pat. No. 9,311,003, which is a continuation of U.S. patent application Ser. No. 14/293,122, filed Jun. 2, 2014, now U.S. Pat. No. 8,943,105, each of which is incorporated herein by reference in its entirety.

FIELD

The embodiments disclosed herein relate to exposing proprietary data to a hypervisor as native hypervisor data.

BACKGROUND

A virtual machine is a software-based emulation of a physical machine (e.g., a computer) that executes programs like the physical machine. Virtual machines generally operate based on the computer architecture and functions of a real computer. Virtual machines generally provide a complete system platform which supports the execution of a complete operating system. Virtual machines usually emulate an existing architecture, and are built with the purpose of either providing a platform to run programs where the real hardware is not available for use (for example, executing on otherwise obsolete platforms), or of having multiple instances of virtual machines leading to more efficient use of computing resources, both in terms of energy consumption and cost effectiveness. This efficient use of computing resources is known as hardware virtualization. The use of a virtual machine may enable: multiple operating system environments to coexist on the same computer, in strong isolation from each other; an instruction set architecture (ISA) that is somewhat different from that of the real machine; and application provisioning, maintenance, high availability, and disaster recovery.

A hypervisor is computer software, computer firmware, or computer hardware that creates and runs virtual machines. A computer on which a hypervisor is running one or more virtual machines is generally referred to as a host machine, while each virtual machine running on the host machine is generally referred to as a guest machine. The hypervisor presents the guest operating systems with a virtual operating platform and manages the execution of the guest operating systems. Multiple instances of a variety of operating systems may share the virtualized hardware resources.

A host machine generally employs a hypervisor to create a guest virtual machine by accessing a virtual machine disk file that contains or references disk data that is necessary to create the guest virtual machine. One common problem encountered when utilizing a hypervisor is that some hypervisors are only designed to access virtual machine disk files that have a particular file format that is native to the hypervisor. For example, Microsoft Hyper-V® hypervisors are designed to only be capable of accessing virtual machine disk files having the VHD and VHDX file formats, which are the native file formats for Microsoft® Hyper-V® hypervisors, for the purpose of creating a guest virtual machine. In particular, Microsoft Hyper-V® technology lacks disk plugin application programming interfaces (APIs) which are necessary to enable third parties to quickly attach disk data from their own disk image formats into Microsoft® Hyper-V® hypervisors for access by virtual machines as virtual machine disk files. This inability of some hypervisors to access a variety of differently-formatted virtual machine disk files, due to a lack of disk plugin APIs for example, limits the virtual machine disk files that can be used to create virtual machines using these hypervisors.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to exposing proprietary data to a hypervisor as native hypervisor data. The example methods disclosed herein may be employed to allow a hypervisor on a host machine to create guest virtual machines using proprietary disk files even where the hypervisor is designed to only be capable of creating guest virtual machines using native hypervisor disk files. The example methods disclosed herein therefore enable a hypervisor to access a variety of differently-formatted disk files and thereby expand the types of disk files that can be used by the hypervisor to create guest virtual machines.

In one example embodiment, one or more non-transitory computer-readable media store one or more programs that are configured, when executed, to cause one or more processors to perform a method of exposing proprietary data to a hypervisor as native hypervisor data. The method may include identifying a proprietary disk file having a proprietary file format and creating a plugin file corresponding to the proprietary disk file with the plugin file having a plugin file format which is different from a native hypervisor disk file format.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The phrase "native hypervisor disk file" as used herein refers to a virtual machine disk file having a file format that is native to a particular hypervisor. An example is the VHDX file format used by Microsoft® Hyper-V® hypervisors. Another example is the VMDK file format used by VMware® hypervisors. The phrase "proprietary file format" as used herein refers to a file format which is not natively understood by a particular hypervisor. The phrase "proprietary disk file" as used herein refers to a file, or data storage system such as a deduplication vault or database, which contains disk data and which is structured in a proprietary file format. An example is the StorageCraft® ShadowProtect® Full (SPF) backup image file format. The phrase "plugin file" as used herein refers to a file corresponding to a native hypervisor disk file which is recognizable by a file system filter driver and which appears to be a native hypervisor disk file to the operating system, the hypervisor, and to all other applications due to the filtering functionality provided by a file system filter driver. This file generally points to the proprietary disk file and is generally much smaller in size that a corresponding real native hypervisor disk file would be. An example would be a file named "vm.vhdx" which, because of its "vhdx" file extension, and due to the filtering activity of a file system filter driver, appears to be a Microsoft® Hyper-V® VHDX native hypervisor disk file, but in reality does not necessarily contain the typical content or structure of a native hypervisor disk file, and rather is in reality a plugin file that points to a corresponding SPF backup image proprietary disk file named "vm.spf" that is separate from the plugin file. The phrase "plugin file format" as used herein refers to a file format of a plugin file which is different from the native hypervisor disk file format of the native hypervisor disk file to which the plugin file corresponds, because the structure of the plugin file format is different from the native hypervisor disk file format and/or because at least some portion of the data that would typically be stored in the plugin file (having the same structure as the native hypervisor disk file format) is stored elsewhere. From the example above, the plugin file "vm.vhdx" would have a plugin file format structure that is different from the native hypervisor disk file format structure of VHDX native hypervisor disk files. In another example, a plugin file named "vm2.vhdx" could have a plugin file format structure that is the same as the VHDX native hypervisor disk file format structure, but the "vm2.vhdx" plugin file could be missing some data that would typically be stored in the native hypervisor disk file but is instead retrievable from a corresponding SPF backup image proprietary disk file named "vm2.spf" using a file system filter driver.

Figure 1:
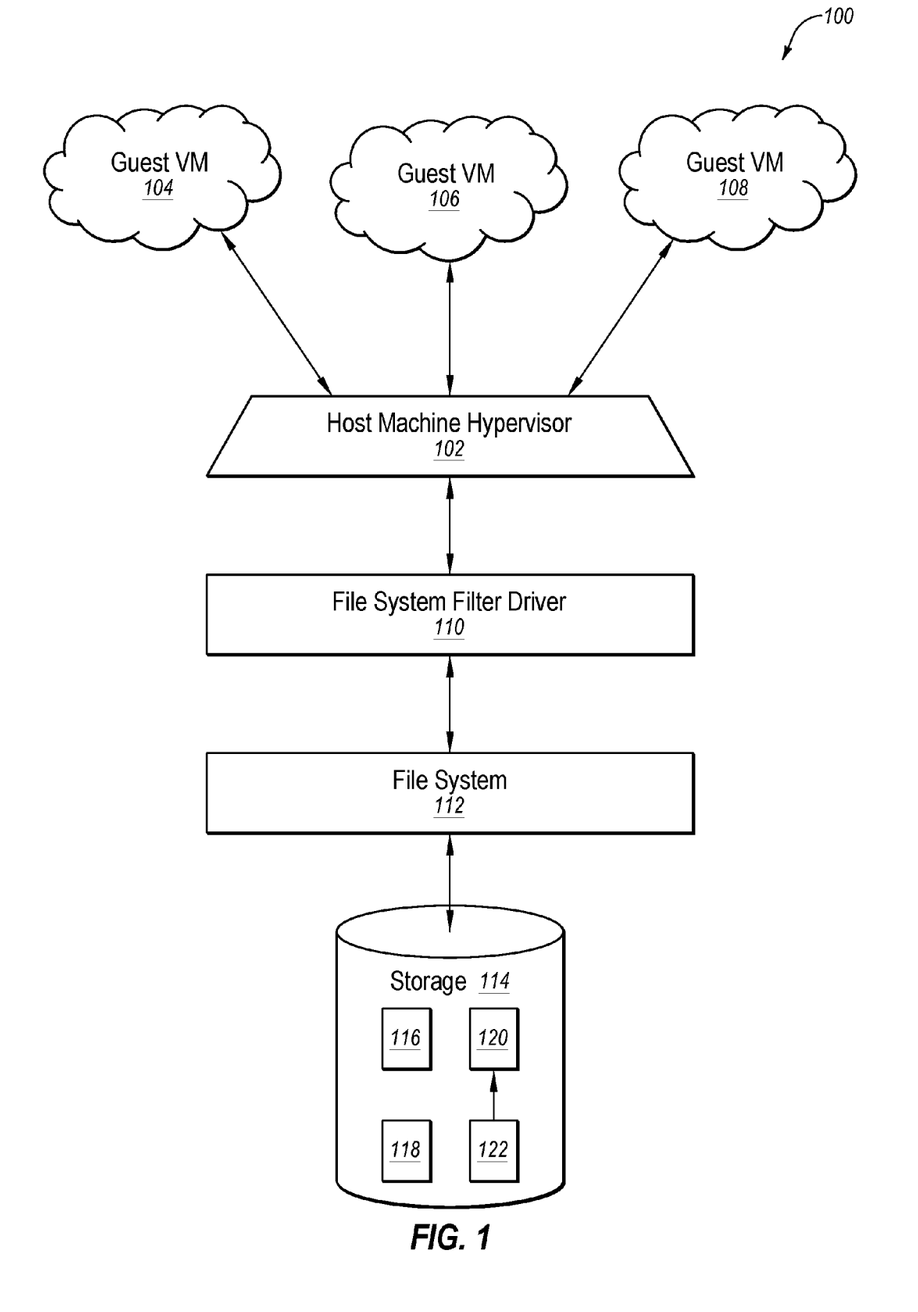
FIG. 1 is a schematic block diagram illustrating an example hypervisor system.

FIG. 1 is a schematic block diagram illustrating an example hypervisor system 100. As disclosed in FIG. 1, the example system 100 includes a host machine hypervisor 102, multiple guest virtual machines 104, 106, and 108, a file system filter driver 110, a file system 112, and a storage 114. The storage 114 includes native hypervisor disk files 116 and 118, a proprietary disk file 120, and a plugin file 122.

The hypervisor 102 may be computer software, computer firmware, or computer hardware of a host machine (not shown) that is configured to create, run, and manage one or more guest virtual machines, such as the virtual machines 104, 106, and 108. The virtual machines 104, 106, and 108 are virtual machines that were created by, run by, and managed by the hypervisor 102. Each of the virtual machines 104, 106, and 108 is a software-based emulation of a physical machine (e.g., a computer) that is configured to execute programs like the physical machine.

The creation of each of the virtual machines 104, 106, and 108 was achieved by the hypervisor 102 accessing a disk file in the storage 114. In particular, the hypervisor 102 created the virtual machine 104 by accessing the native hypervisor disk file 116, which has the native file format of the hypervisor 102. Similarly, the hypervisor 102 created the virtual machine 106 by accessing the native hypervisor disk file 118, which also has the native file format of the hypervisor 102.

In contrast, the hypervisor 102 created the virtual machine 108 by the file system filter driver 110 exposing the proprietary disk file 120 to the hypervisor 102. The proprietary disk file 120 has a file format which is not natively understood by the hypervisor 102. Although the hypervisor 102 is not capable of directly accessing the proprietary disk file 120 due to the proprietary disk file 120 having a file format that is not natively understood by the hypervisor 102, the methods disclosed herein enable the file system filter driver 110 to expose the proprietary disk file 120 to the hypervisor 102 in the native file format of the hypervisor 102.

In one example embodiment, the hypervisor 102 may be a Microsoft® Hyper-V® hypervisor, and the proprietary disk file 120 may be a StorageCraft® ShadowProtect® Full (SPF) backup image file. Using the example methods disclosed herein, the Microsoft® Hyper-V® hypervisor may create the virtual machine 108 using the SPF backup image file and/or using a corresponding plugin file, even though the SPF backup image file format is not natively understood by the Microsoft® Hyper-V® hypervisor. This is accomplished by the file system filter driver 110 intercepting each request sent from the Microsoft® Hyper-V® hypervisor to the SPF backup image file and/or to the plugin file, and responding to the request in such a way that the SPF backup image file and/or the plugin file appears to be a valid VHDX file, which is a native hypervisor disk file for Microsoft® Hyper-V® hypervisors. In this manner, even though the Microsoft® Hyper-V® hypervisor is not capable of directly accessing the SPF backup image file due to the SPF backup image file having a file format that is not natively understood by the Microsoft® Hyper-V® hypervisor, the methods disclosed herein enable the file system filter driver 110 to expose the SPF backup image file to the Microsoft® Hyper-V® hypervisor in the native VHDX file format of the Microsoft® Hyper-V® hypervisor, thereby expanding the types of disk files that can be used by the Microsoft® Hyper-V® hypervisor to create guest virtual machines.

Although only a single storage is disclosed in the system 100 in FIG. 1, it is understood that the system 100 may instead include two or more storages. Further, although the storage 114 is disclosed in FIG. 1 being local to the hypervisor 102, it is understood that the storage 114 may be remote from the hypervisor 102. Further, one or more of the files 116, 118, 120, and 122 may be stored remotely from the hypervisor 102. For example, the plugin file 122 may be stored locally to the hypervisor 102 while the proprietary disk file 120 is stored remotely from the hypervisor 102. Further, although the file system filter driver 110 is the only filter driver disclosed in the example system 100 of FIG. 1, it is understood that the functionality of the file system filter driver 110 may be replaced or augmented by one or more similar filter drivers residing on the system 100 or another system that is local to or remote from the system 100. Additionally, the proprietary disk file 120 may not be an actual file but may instead be any other data storage system such as a deduplication vault or database, which contains disk data and which is structured in a proprietary file format.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

FIGS. 2A-2D are a schematic flowchart diagram of an example method 200 of exposing a proprietary disk file to a hypervisor as a native hypervisor disk file. The method 200 may be implemented, in at least some embodiments, by the hypervisor 102, the file system filter driver 110, and the file system 112 of the system 100 of FIG. 1. For example, the hypervisor 102, the file system filter driver 110, and the file system 112 may be configured to execute computer instructions to perform operations of exposing data from the proprietary disk file 120, using the plugin file 122, to the hypervisor 102 as a native hypervisor disk file, as represented by one or more of the steps 202-264 of the method 200. Although illustrated as discrete steps, various steps may be divided into additional steps, combined into fewer steps, or eliminated, depending on the desired implementation. The method 200 will now be discussed with reference to FIGS. 1 and 2A-2D.

Figure 2A:
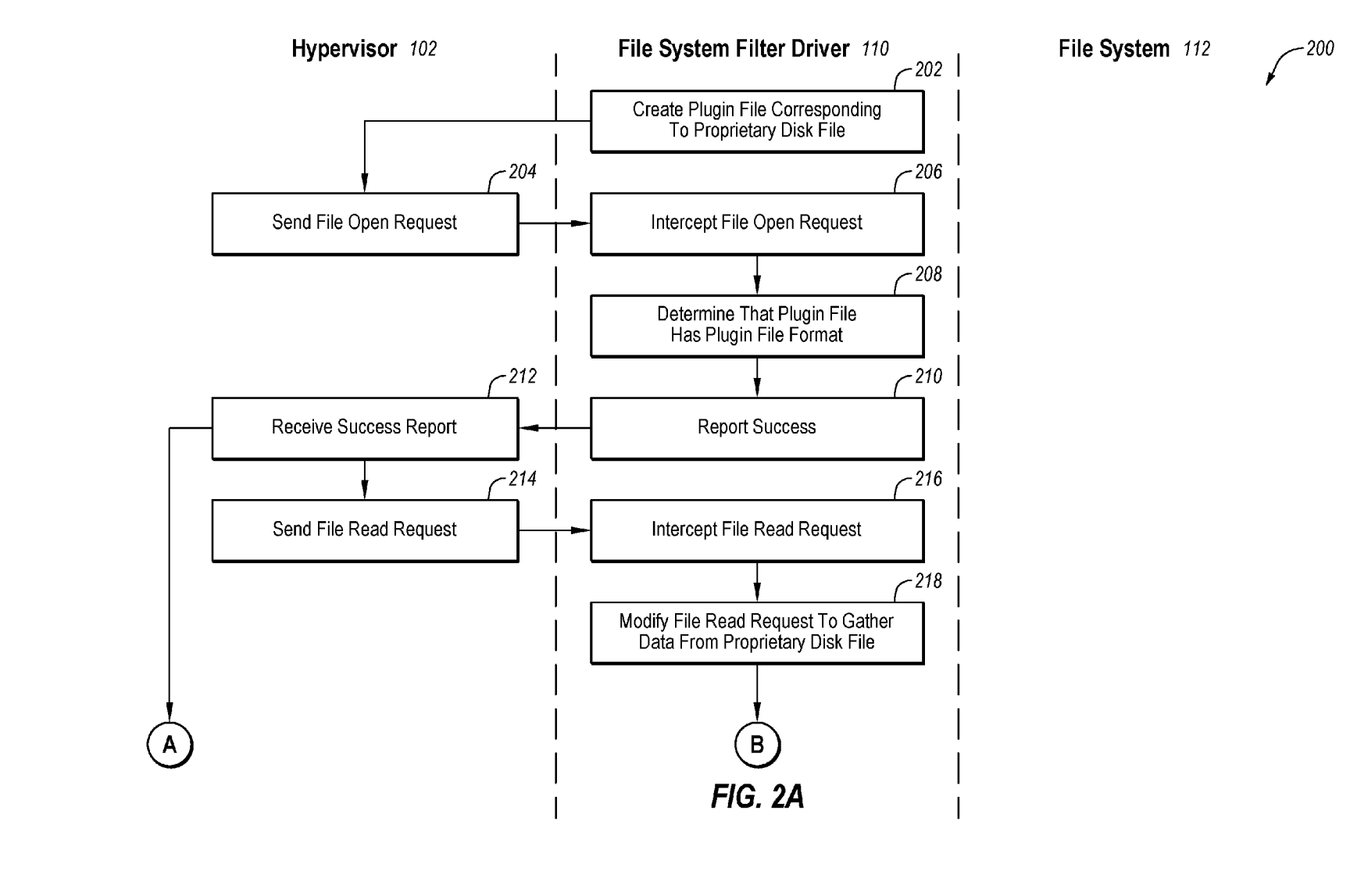
FIGS. 2A-2D are a schematic flowchart diagram of an example method of exposing a proprietary disk file to a hypervisor as a native hypervisor disk file.

The method 200 may include a step 202, in which a plugin file corresponding to a proprietary disk file is created. For example, the file system filter driver 110 may, at step 202, create the plugin file 122 that corresponds to the proprietary disk file 120. Alternatively, another driver or module, such as a user-mode module that runs on the same host machine as the hypervisor 102 or that runs on another local or remote machine, may, at step 202, create the plugin file 122 that corresponds to the proprietary disk file 120. As noted above, the proprietary disk file 120 has a proprietary file format and the plugin file 122 has a plugin file format. Also noted above, the plugin file 122 may be stored in the storage 114 where the proprietary disk file 120 is stored, or the plugin file 122 and/or the proprietary disk file 120 may be stored in another local or remote storage. As illustrated in FIG. 1, the plugin file 122 may include a pointer that points to the proprietary disk file 120. Additionally or alternatively, the plugin file 122 may be associated with the proprietary disk file 120 using a data storage system that is external to the plugin file 122, such as a database that is stored elsewhere in the storage 110 or in another local or remote storage.

The method 200 may include a step 204, in which a file open request is sent, and a step 206, in which the file open request is intercepted. For example, the hypervisor 102 may, at step 204, send a file open request directed to the plugin file 122 and the file system filter driver 110 may, at step 206, intercept the file open request. This interception of this request, and the interception of all other requests discussed herein, may be possible due to the file system filter driver 110 sitting between the hypervisor 102 and the file system 112 where the plugin file 122 is stored. In this position, the file system filter driver 110 is able to intercept, examine, and modify, if desired, all requests from the hypervisor 102 to the file system 112.

Continuing with the above example, even though the plugin file 122 has a plugin file format, the hypervisor 102 may nevertheless attempt to open the plugin file 122 because the plugin file may falsely appear to have a native file format. For example, a portion of a name attribute of the plugin file 122, such as file extension of the name attribute of the plugin file 122, may falsely identify the plugin file 122 as having the native file format of the hypervisor 102. In this example, the hypervisor 102 may be a Microsoft® Hyper-V® hypervisor, and the plugin file 122 may be named "vm.vhdx," the proprietary disk file 120 is an SPF backup image file named "vm.spf" that is separate from the plugin file 122. The "vhdx" file extension falsely identifies the plugin file 122 as having the native VHDX file format of the Microsoft® Hyper-V® hypervisor 102. In reality, of course, the plugin file 122 does not contain the typical content and/or structure of a native VHDX file, but instead is in reality a plugin file that points to the corresponding SPF backup image file named "vm.spf" that is separate from the plugin file 122.

The method 200 may include a step 208, in which it is determined that the plugin file has a plugin file format. For example, the file system filter driver 110 may, at step 208, determine that the plugin file 122 has a plugin file format. This determination may be made in a variety of different ways. For example, the file system filter driver 110 may determine that the plugin file 122 has a plugin file format by determining that metadata that identifies the plugin file 122 as having a plugin file format is present in the plugin file 122. Alternatively or additionally, the file system filter driver 110 may determine that the plugin file 122 has a plugin file format by determining that the plugin file 122 is present in a list of files that have the plugin file format this is stored in a data storage system that is external to the plugin file 122, such as a database that is stored elsewhere in the storage 114 or in another storage.

The method 200 may include a step 210, in which success is reported, and a step 212, in which the success report is received. For example, the file system filter driver 110 may, at step 210, respond to the previously received file open request with a report that the plugin file 122 was opened successfully, and the hypervisor 102 may, at step 212, receive the success report.

This reporting of success may be performed at steps 210 and 212 either after actually having opened the proprietary disk file 120 or without actually having opened the proprietary disk file 120. In practice, it has been discovered that at least some hypervisors perform many reads of metadata of a virtual machine disk file without actually requesting disk data, and do so between several consecutive file open and file close requests on the virtual machine disk files. This occurs most often when virtual machine disk files are being attached to guest virtual machines, or when virtual machine configuration settings are being modified. Therefore, to improve performance, the user experience, and reduce resource usage, the file system filter driver 110 may defer actually opening the proprietary disk file 120 until absolutely necessary. This may involve storing sufficient metadata to respond to other reads of virtual machine disk file metadata within the plugin file 122 itself, so that such requests can be responded to without the typically-expensive need to open the proprietary disk file 120.

After the performance of step 212, the hypervisor 102 will believe that a native hypervisor disk file having the native file format of the hypervisor 102 has been opened, even though the actual file that has been accessed is the plugin file 122 that has a plugin file format. The plugin file 122 will be subsequently used by the file system filter driver 110 to expose the proprietary disk file 120 to the hypervisor 102 in the native file format of the hypervisor 102.

After the performance of step 212, the method 200 may proceed to any of the steps 214, 236, or 256. Although the steps 214-264 will be disclosed in ascending order below, it is understood that any of the groups of steps 214-234, 236-254, and 256-264 may be performed at any time, including repeatedly, after the performance of step 212.

Figure 2B:
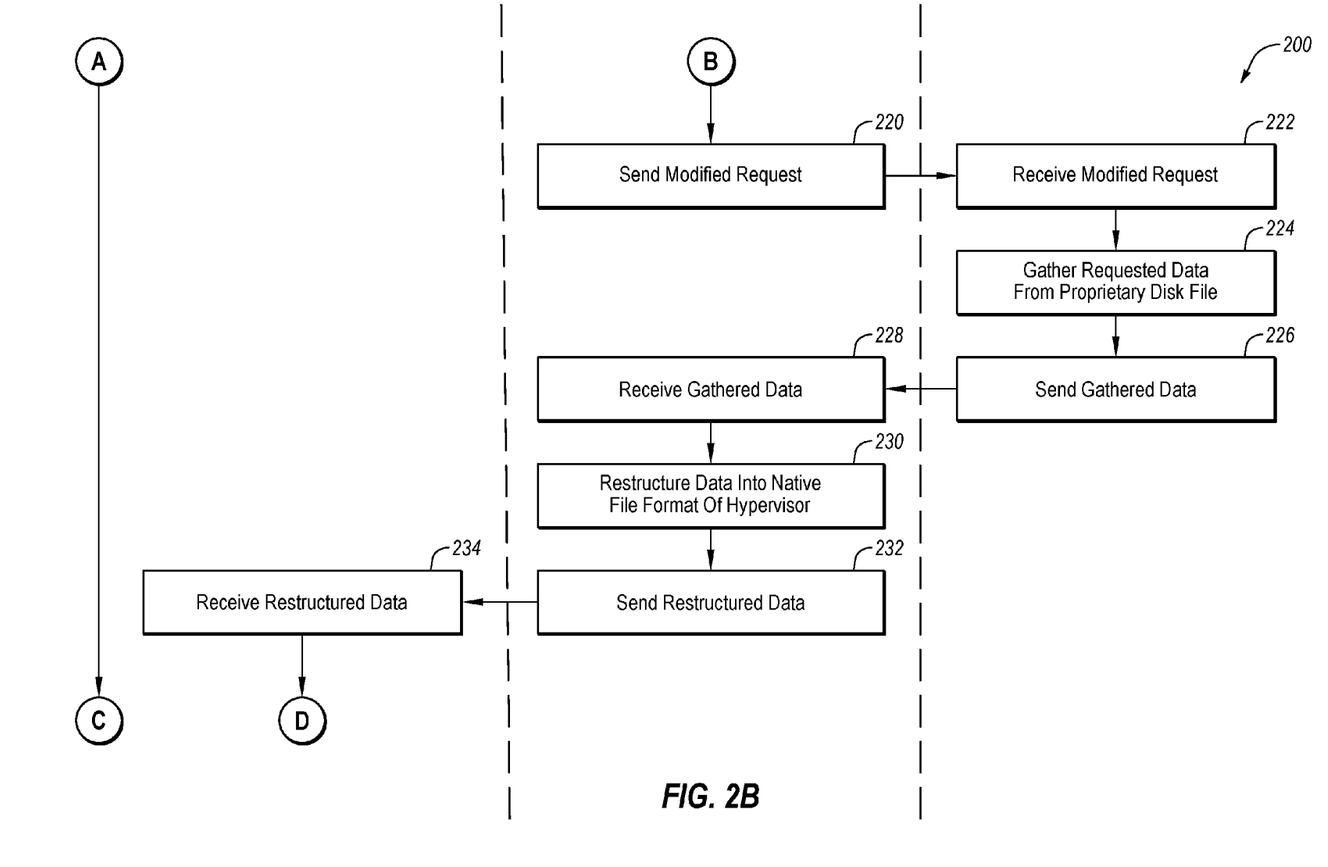

The method 200 may include a step 214, in which a file read request is sent, and a step 216, in which the file read request is intercepted. For example, the hypervisor 102 may, at step 214, send a file read request directed to the plugin file 122 and the file system filter driver 110 may, at step 216, intercept the file read request.

The method 200 may include a step 218, in which the read request is modified to gather data from a proprietary disk file. For example, the file system filter driver 110 may, at step 218, modify the read request to direct that data be gathered from the proprietary disk file 120 instead of from the plugin file 122. This modification may be enabled by the pointer in the plugin file 122 and thereby indicates that the proprietary disk file 120 should be the actual target of any read and/or write requests sent by the hypervisor 102 to the plugin file 122.

The method 200 may include a step 220, in which the modified request is sent, and a step 222, in which the modified request is received. For example, the file system filter driver 110 may, at step 220, send the modified request and the file system 112 may, at step 222, receive the modified request.

The method 200 may include a step 224, in which the requested data is gathered from the proprietary disk file. For example, the file system 112 may, at step 224, gather data from the proprietary disk file 120 as instructed by the modified request.

The method 200 may include a step 226, in which the gathered data is sent, and a step 228, in which the gathered data is received. For example, the file system 112 may, at step 226, send the gathered data and the file system filter driver 110 may, at step 228, receive the gathered data.

The method 200 may include a step 230, in which the data is restructured into a native file format of the hypervisor. For example, the file system filter driver 110 may, at step 230, restructure the data that was received into the native file format of the hypervisor 102. This restructuring of the data may be intended to make the data appear to the hypervisor 102 to have been gathered from a native hypervisor disk file due to being formatted in the native file format of the hypervisor 102.

The method 200 may include a step 232, in which the restructured data is sent, and a step 234, in which the restructured data is received. For example, the file system filter driver 110 may, at step 232, send the restructured data, and the hypervisor 102 may, at step 234, receive the restructured data.

After the performance of step 234, the hypervisor 102 will have been deceived by the file system filter driver 110 to believe that a read request was successfully executed on a native hypervisor disk file having the native file format of the hypervisor 102, even though the actual file that has been read from is the proprietary disk file 120 having a proprietary file format. This deception on the part of the file system filter driver 110 allows the file system filter driver 110 to expose the proprietary disk file 120 to the hypervisor 102 in the native file format of the hypervisor 102, thereby expanding the types of disk files that can be effectively read by the hypervisor 102.

Figure 2C:
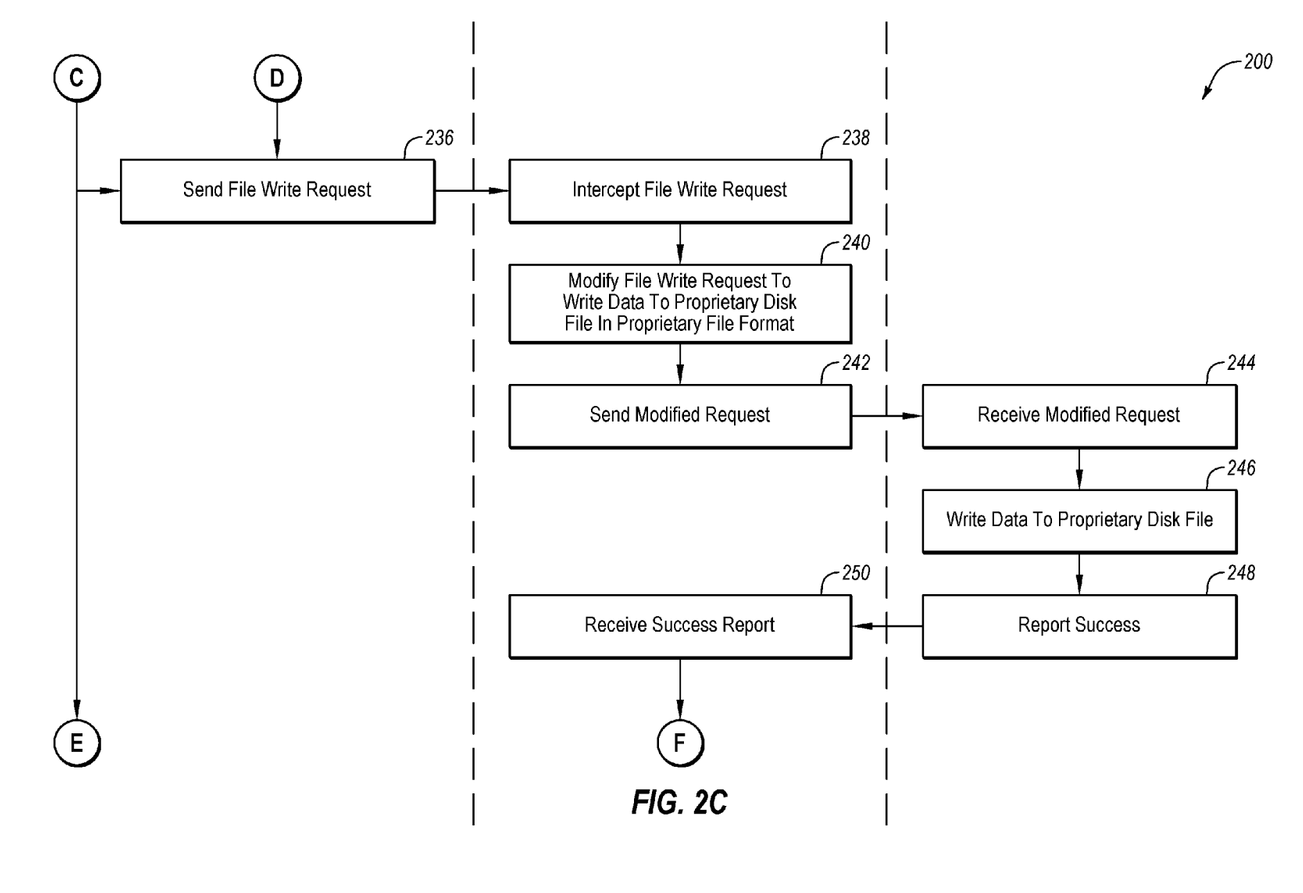

The method 200 may include a step 236, in which a file write request is sent, and a step 238, in which the file write request is intercepted. For example, the hypervisor 102 may, at step 236, send a file write request directed to a particular location in the plugin file 122 and the file system filter driver 110 may, at step 238, intercept the file write request.

The method 200 may include a step 240, in which the file write request is modified to write the data to a location in the proprietary disk file in the proprietary file format. For example, the file system filter driver 110 may, at step 240, modify the file write request to direct that data be written to a location in the proprietary disk file 120 instead of to the plugin file 122.

The method 200 may include a step 242, in which the modified request is sent, and a step 244, in which the modified request is received. For example, the file system filter driver 110 may, at step 242, send the modified request and the file system 112 may, at step 244, receive the modified request.

The method 200 may include a step 246, in which the data is written to the proprietary disk file. For example, the file system 112 may, at step 246, write the data from the modified write request to the proprietary disk file 120 as instructed by the modified request.

The method 200 may include a step 248, in which a success is reported, and a step 250, in which the success report is received. For example, the file system 112 may, at step 248, report success and the file system filter driver 110 may, at step 250, receive the success report.

The method 200 may include a step 252, in which a success is reported, and a step 254, in which the success report is received. For example, the file system filter driver 110 may, at step 252, report success, and the hypervisor 102 may, at step 254, receive the success report.

After the performance of step 254, the hypervisor 102 will have been deceived by the file system filter driver 110 to believe that a write request was successfully executed on a native hypervisor disk file having the native file format of the hypervisor 102, even though the actual file that has been written to is the proprietary disk file 120 having a proprietary file format. This deception on the part of the file system filter driver 110 allows the file system filter driver 110 to expose the proprietary disk file 120 to the hypervisor 102 in the native file format of the hypervisor 102, thereby expanding the types of disk files that can be effectively written to by the hypervisor 102.

Figure 2D:
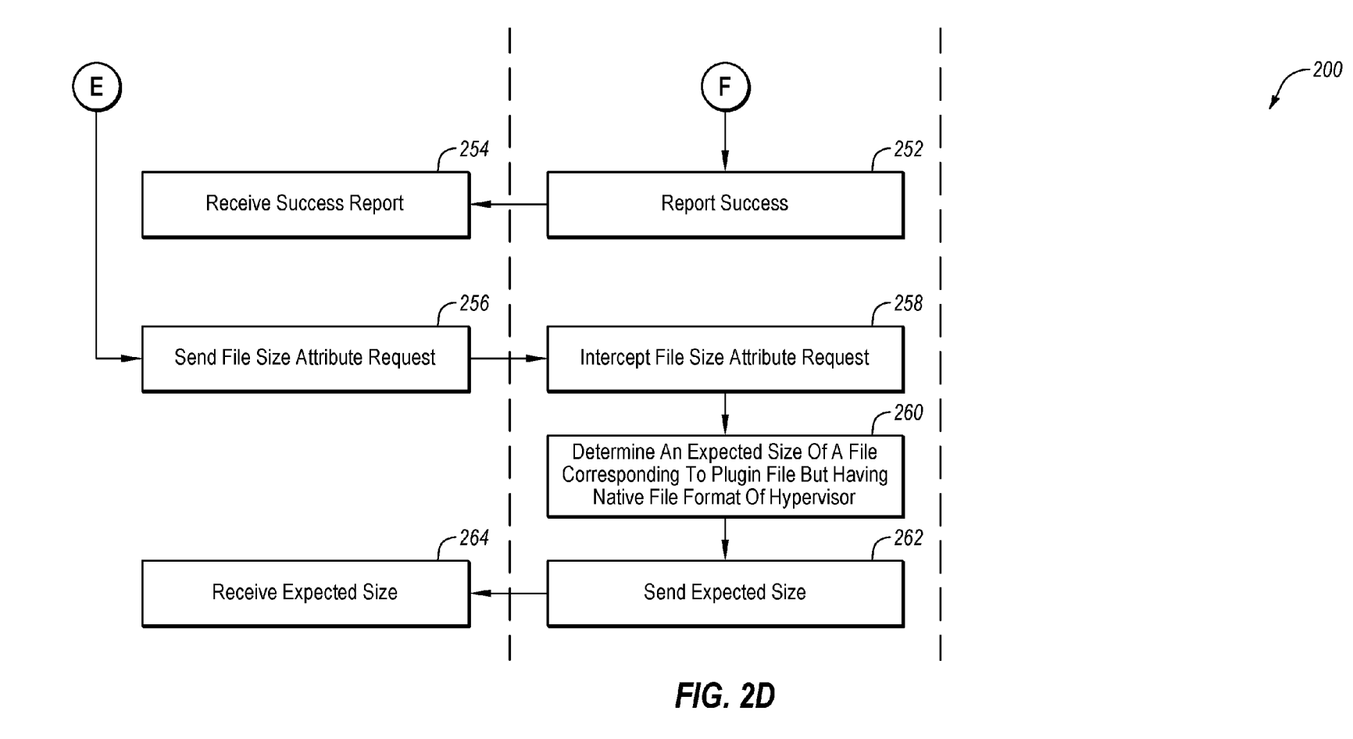

The method 200 may include a step 256, in which a file size attribute request is sent, and a step 258, in which the file size attribute request is intercepted. For example, the hypervisor 102 may, at step 256, send a file size attribute request directed to the plugin file 122 and the file system filter driver 110 may, at step 258, intercept the file size attribute request.

The method 200 may include a step 260, in which an expected size of a file corresponding to the plugin file having the native file format of the hypervisor is determined. For example, the file system filter driver 110 may, at step 260, determine an expected size of a file corresponding to the plugin file 122 having the native file format of the hypervisor 102. In other words, the expected size may be the size that a comparable file having the native file format would have were the comparable file to be created to replace the combination of the plugin file 122 and the proprietary disk file 120.

The method 200 may include a step 262, in which the expected size is sent, and a step 264, in which the expected size is received. For example, the file system filter driver 110 may, at step 262, send the expected size, and the hypervisor 102 may, at step 264, receive the expected size.

After the performance of step 264, the hypervisor 102 will have been deceived by the file system filter driver 110 to believe that a file size attribute request was successfully executed on a native hypervisor disk file having the expected file size of a native hypervisor disk file of the hypervisor 102, even though the actual file that has been the subject of the file size attribute request is the plugin file 122 whose size may not match the expected size of a native hypervisor disk file. This deception on the part of the file system filter driver 110 allows the file system filter driver 110 to expose the proprietary disk file 120 to the hypervisor 102 in the expected file size of the native hypervisor disk file of the hypervisor 102, thereby expanding the types of disk files that can be used by the hypervisor 102.

It is understood that the steps 202, 206, 208, 210, 216, 218, 220, 228, 230, 232, 238, 240, 242, and 250 may be performed by a driver or module other than the file system filter driver 110, such as a user-mode module that runs on the same host machine as the hypervisor 102.

It is also understood that the steps 260-264 may be replaced where the plugin file 122 is a sparse file, such as a New Technology File System (NTFS) sparse file, with a size attribute set to an expected size of a corresponding file having the native file format of the hypervisor 102. In this example, the file system filter driver 110 may replace the steps 260-264 while allowing the file size attribute request to pass through the file system filter driver 110 unaltered and allowing the corresponding response to pass through the file system filter driver unaltered.

It is further understood that the steps 218, 220, 222, and 224 may be modified to allow the data requested in the read request to be gathered from the plugin file 122 and/or the proprietary disk file 120, as at least some portion of the requested data may actually be stored in the plugin file 122. Additionally or alternatively, these steps may be modified to allow the data requested to be gathered from any other local or remote data storage system, such as a deduplication vault or database.

It is also understood that the steps 240, 242, 244, and 246 may be modified to allow the data specified in the write request to be written to a location in the plugin file 122 or in a location external to the plugin file 122. Further, the data may be stored in the native file format of the hypervisor 102 or in a proprietary file format.

It is also understood that steps 236-254 may alternatively be modified to allow a hypervisor having native snapshotting/differencing-disk capability to itself handle all write requests of a guest virtual machine by performing the write requests on a differencing disk file instead of on a plugin file. For example, where the hypervisor 102 supports the creation of differencing disk files, which are snapshots of a virtual machine disk file, the files system filter driver 110, or other driver or module of the system 100, can instruct the hypervisor 102 to create a differencing disk associated with the plugin file 122. A differencing disk file may be similar in some respects to an incremental backup image file, such as a StorageCraft® ShadowProtect® Incremental (SPI) backup image file. However unlike SPI backup image files, which are updated with sequentially-increasing offsets, differencing disk files may permit random-offset writes of virtual machine disk data. After the creation of the differencing disk file, all writes of the guest virtual machine 108 to the plugin file 122 will instead be written by the hypervisor 102 to the differencing disk file. The differencing disk file may have a native hypervisor disk file format, such as a VHDX or VMDK file format. In this alternative to steps 236-254, all of the write requests from the guest virtual machine 108 are handled by the hypervisor 102 itself and are sent directly to the differencing disk file. The hypervisor in this alternative embodiment continues to issue read requests to the plugin file 122 but directs all write requests to the differencing disk file.

It is further understood that each of the steps discussed herein that involve "modifying" a request may instead be implemented by replacing, and/or associating, the request with one or more new request(s) that is/are configured to accomplish the same end result as a "modified" request. For example, a "modification" of a read request may involve queuing the read request and initiating an associated read request to a proprietary disk file. The data received in response to the associated read request may then be filled into the queued read request's buffer, such as by copying the associated read request's buffer into the buffer for the queued read request. In this example, both the queued read request and the associated read request may use a shared buffer or they may have their own distinct buffers.

The embodiments described herein may include the use of a special-purpose or general-purpose computer including various computer hardware or software modules or filters, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" or "filter" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. One or more non-transitory computer-readable media storing one or more programs that are configured, when executed, to cause one or more processors to perform a method, the method comprising:
   identifying a proprietary disk file having a proprietary file format;
   creating a plugin file corresponding to the proprietary disk file, the plugin file having a plugin file format which is different from a native hypervisor disk file format; and
   exposing proprietary data from the proprietary disk file to a hypervisor as native hypervisor data using the plugin file.

2. The one or more non-transitory computer-readable media as recited in claim 1, wherein the exposing of the proprietary data includes:
   intercepting read requests directed to the plugin file; and
   in response to each read request:
      gathering the proprietary data from the proprietary disk file;

restructuring the proprietary data to cause the proprietary data to appear to be gathered from a native hypervisor disk file due to being structured in the native hypervisor disk file format; and responding with the restructured data.

3. The one or more non-transitory computer-readable media as recited in claim 1, wherein a portion of a name attribute of the plugin file falsely identifies the plugin file as having the native hypervisor disk file format.

4. The one or more non-transitory computer-readable media as recited in claim 3, wherein the portion of the name attribute of the plugin file is a file extension of the name attribute of the plugin file.

5. The one or more non-transitory computer-readable media as recited in claim 1, wherein the plugin file includes metadata that identifies the plugin file as having the plugin file format.

6. The one or more non-transitory computer-readable media as recited in claim 1, wherein a data storage system external to the plugin file identifies the plugin file as having the plugin file format.

7. The one or more non-transitory computer-readable media as recited in claim 6, wherein the data storage system stores a list of files that have the plugin file format.

8. The one or more non-transitory computer-readable media as recited in claim 1, wherein the plugin file is a sparse file with a size attribute set to an expected size of a corresponding file having the native hypervisor disk file format.

9. The one or more non-transitory computer-readable media as recited in claim 8, wherein the method further comprises:
   intercepting a file size attribute request directed to the plugin file; and
   allowing the file size attribute request to pass through unaltered and a corresponding response to pass through unaltered.

10. The one or more non-transitory computer-readable media as recited in claim 1, wherein the exposing of the proprietary data includes:
    creating a differencing disk file associated with the plugin file;
    receiving write requests directed to the plugin file; and
    redirecting the write requests to the differencing disk file.

11. The one or more non-transitory computer-readable media as recited in claim 1, wherein the method further comprises:
    intercepting a file open request directed to the plugin file;
    determining that the plugin file has the plugin file format; and
    responding to the file open request with a report that the plugin file was opened successfully.

12. The one or more non-transitory computer-readable media as recited in claim 1, wherein the method further comprises:
    intercepting a file size attribute request directed to the plugin file;
    determining an expected size of a file corresponding to the plugin file having the native hypervisor disk file format; and
    responding to the file size attribute request with the expected size.

13. The one or more non-transitory computer-readable media as recited in claim 1, wherein the exposing of the proprietary data includes:
    intercepting a write request directed to a particular location in the plugin file;
    executing the write request by storing data from the write request in a location in the plugin file or in a location external to the plugin file with the data structured in the native hypervisor disk file format; and
    responding to the write request with a report that the write request was executed successfully.

14. The one or more non-transitory computer-readable media as recited in claim 13, wherein the method further comprises:
    intercepting a subsequent read request directed to the particular location in the plugin file; and
    responding to the subsequent read request with second data gathered from the location where the data from the write request was previously stored, the second data appearing to be gathered from a native hypervisor disk file due to being structured in the native hypervisor disk file format.

* * * * *